US010826037B2

(12) United States Patent
Oki et al.

(10) Patent No.: US 10,826,037 B2
(45) Date of Patent: Nov. 3, 2020

(54) VEHICLE-MOUNTED BATTERY APPARATUS

(71) Applicant: TOYOTA JIDOSHA KABUSHIKI KAISHA, Toyota-shi, Aichi-ken (JP)

(72) Inventors: Atsushi Oki, Nagoya (JP); Junta Katayama, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 70 days.

(21) Appl. No.: 16/227,811

(22) Filed: Dec. 20, 2018

(65) Prior Publication Data

US 2019/0198835 A1 Jun. 27, 2019

(30) Foreign Application Priority Data

Dec. 27, 2017 (JP) .................... 2017-250782

(51) Int. Cl.
*H01M 2/12* (2006.01)
*H01M 2/10* (2006.01)
*B60L 50/64* (2019.01)
*B60K 6/28* (2007.10)

(52) U.S. Cl.
CPC .......... *H01M 2/1264* (2013.01); *B60L 50/64* (2019.02); *H01M 2/1077* (2013.01); *B60K 6/28* (2013.01); *B60Y 2200/91* (2013.01); *B60Y 2200/92* (2013.01); *B60Y 2400/112* (2013.01); *H01M 2220/20* (2013.01)

(58) Field of Classification Search
CPC ................. H01M 2220/20; H01M 2/1083
See application file for complete search history.

(56) References Cited

U.S. PATENT DOCUMENTS 3,913,707 A * 10/1975 Wastenson ............... F16F 7/01
188/374
2011/0068309 A1* 3/2011 Haslberger .............. B60L 50/50
254/2 R

FOREIGN PATENT DOCUMENTS

JP 2017-50055 A 3/2017
JP 2017-91950 A 5/2017
WO WO 2012133710 * 4/2012

* cited by examiner

*Primary Examiner* — Olatunji A Godo
(74) *Attorney, Agent, or Firm* — Sughrue Mion, PLLC (57) ABSTRACT

A vehicle-mounted battery apparatus to be mounted in a vehicle includes: a battery pack, the battery pack including a battery cell, the battery cell including a gas exhaust portion configured to discharge internal gas; a smoke exhaust duct connected to the battery pack and configured to discharge gas to an outside of the vehicle; and a check valve disposed in the smoke exhaust duct and configured to block flow of gas from the outside of the vehicle toward the battery pack. The check valve includes: a valve seat disposed in the smoke exhaust duct and having a hole; a valve body configured to be seated on the valve seat to cover the hole; and a shock absorbing member disposed between the valve body and the valve seat to alleviate impact of the valve body against the valve seat.

4 Claims, 7 Drawing Sheets

VEHICLE-MOUNTED BATTERY APPARATUS

This nonprovisional application is based on Japanese Patent Application No. 2017-250782 filed on Dec. 27, 2017 with the Japan Patent Office, the entire contents of which are hereby incorporated by reference.

BACKGROUND

Field

The present disclosure relates to a battery apparatus to be mounted in a vehicle (also referred to herein as "vehicle-mounted battery apparatus").

Description of the Background Art

Vehicle-mounted battery apparatuses are disclosed for example in Japanese Patent Laying-Open Nos. 2017-50055 and 2017-91950. Respective vehicle-mounted battery apparatuses structured as disclosed in these documents are each equipped with a smoke exhaust duct for discharging gas from inside a battery. The smoke exhaust duct is connected to extend to the outside of the vehicle so that gas can be discharged to the outside of the vehicle.

SUMMARY

In the structures disclosed in the above-identified patent documents, air may flow from the outside of the vehicle into the smoke exhaust duct when a pressure difference is generated between the inside and the outside of the vehicle while the vehicle is running or upon door opening/closing, for example. As a result of this, a valve body may be lifted up to hit against a valve seat and thereby generate unusual noise.

The present disclosure is given to provide solutions to the above problem, and an object of the present disclosure is to provide a vehicle-mounted battery apparatus capable of suppressing generation of unusual noise.

A vehicle-mounted battery apparatus according to the present disclosure includes: a battery pack configured to be mounted in a vehicle and supply electric power to a driving motor of the vehicle, the battery pack including a battery cell, the battery cell including a gas exhaust portion configured to discharge internal gas; a smoke exhaust duct connected to the battery pack and configured to discharge gas to an outside of the vehicle; and a check valve disposed in the smoke exhaust duct and configured to block flow of gas from the outside of the vehicle toward the battery pack. The check valve includes: a valve seat disposed in the smoke exhaust duct and having a hole; a valve body configured to be seated on the valve seat to cover the hole; and a shock absorbing member disposed between the valve body and the valve seat to alleviate impact of the valve body against the valve seat.

In the vehicle-mounted battery apparatus configured in the above-described manner, the shock absorbing member is disposed between the valve body and the valve seat to alleviate impact of the valve body against the valve seat. Accordingly, even when the valve body is lifted up, the presence of the shock absorbing member between the valve body and the valve seat prevents direct contact between the valve body and the valve seat to thereby suppress generation of unusual noise.

The shock absorbing member is fixed to the valve body. The stiffness of the valve body is thus enhanced so that the valve body is less likely to be lifted up even when air flows into the smoke exhaust duct. Accordingly, generation of unusual noise can be suppressed.

The shock absorbing member is disposed on a surface of the valve body, the surface facing the valve seat. When the vehicle vibrates, the frictional force is generated between the shock absorbing member and the valve seat and movement of the valve body can be restricted by this frictional force. Accordingly, generation of unusual noise due to movement of the valve body resultant from vibration of the vehicle can be suppressed.

The smoke exhaust duct includes: a first member having the hole; and a second member being in contact with the first member to form a smoke exhaust space in which gas flows. The first member includes a bearing having an opening facing upward. The valve body includes a pivot shaft. The pivot shaft is pivotally supported by the bearing. The second member is in contact with the first member to form the smoke exhaust space in which gas flows and cover the opening of the bearing so as to prevent the pivot shaft of the valve body from coming off from the bearing. Because the second member is made in contact with the first member to form the smoke exhaust space and simultaneously prevent the pivot shaft from coming off. Accordingly, without addition of a new member, the pivot shaft can be prevented from coming off.

The first member includes an exhaust port through which gas discharged from the battery pack is released to the outside of the vehicle. The vehicle-mounted battery apparatus further includes a ridge located between the exhaust port and the hole. Even when water enters from downstream, the ridge can block the water.

The shock absorbing member is a porous material. Foreign matters can be held in pores in the porous material. Accordingly, entering and scattering of foreign matter can be prevented.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Embodiments are described hereinafter with reference to the drawings. In the following embodiments, the same or corresponding parts are denoted by the same reference characters, and a description thereof is not repeated. Moreover, the embodiments may be combined.

First Embodiment

Figure 1:
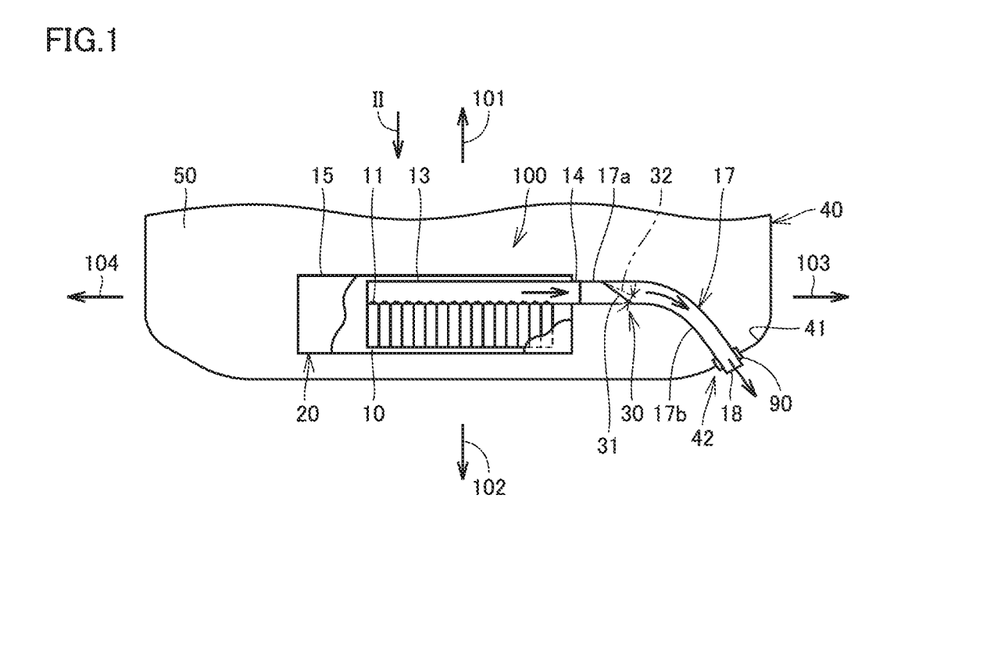
FIG. 1 is a side view of a vehicle-mounted battery apparatus according to a first embodiment.
Figure 2:
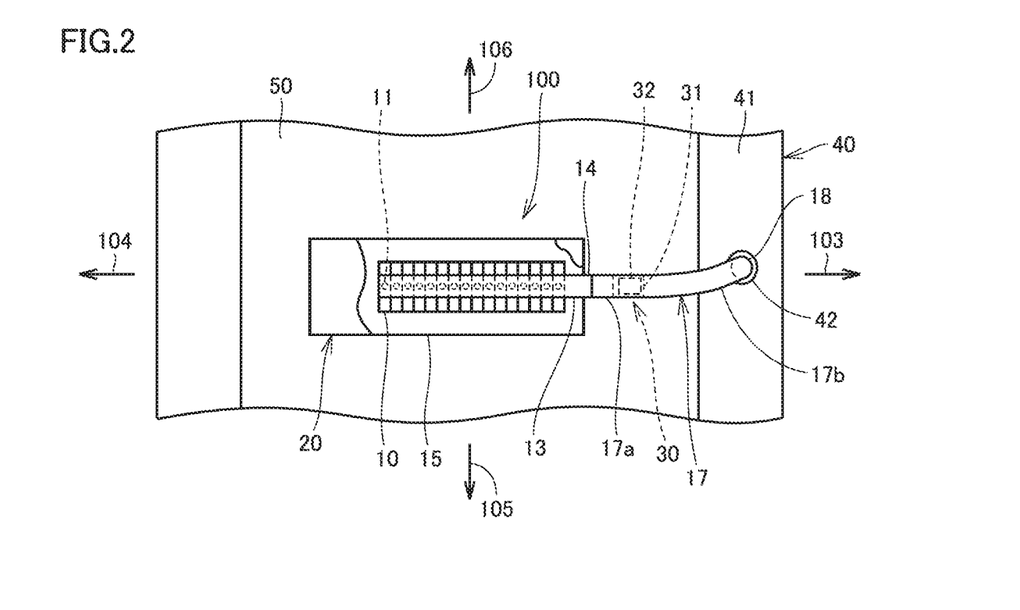
FIG. 2 is a plan view of the vehicle-mounted battery apparatus as seen in the direction indicated by arrow II in FIG. 1.

FIG. 1 is a side view of a vehicle-mounted battery apparatus according to a first embodiment. FIG. 2 is a plan view of the vehicle-mounted battery apparatus as seen in the direction indicated by arrow II in FIG. 1. As shown in FIGS. 1 and 2, vehicle-mounted battery apparatus 100 according to the present embodiment is mounted in a vehicle 40.

In FIGS. 1 and 2, arrow 101 indicates the upward direction of vehicle 40, arrow 102 indicates the downward direction of vehicle 40, arrow 103 indicates the rightward direction of vehicle 40, arrow 104 indicates the leftward direction of vehicle 40, arrow 105 indicates the rearward direction of vehicle 40, and arrow 106 indicates the frontward direction of vehicle 40.

Vehicle-mounted battery apparatus 100 includes a battery pack 20 and a smoke exhaust duct 17 connected to battery pack 20 for discharging gas to the outside of the vehicle. Battery pack 20 includes a battery cell 10 constructed by a lithium-ion cell, a casing 15 which houses battery cell 10, and a smoke exhaust path 13 disposed in casing 15 and located on battery cell 10. FIG. 1 shows casing 15 partially cut away so that battery cell 10 housed in casing 15 is visible.

Battery cell 10 has a positive electrode plate including a positive electrode active material layer, a negative electrode plate including a negative electrode active material layer, and a separator between the positive electrode plate and the negative electrode plate. The positive electrode plate, the negative electrode plate, and the separator are stacked together and wound in a scroll shape to form a power generating element. The power generating element is housed together with an electrolyte solution in a rectangular thin-thickness container. To a central portion of the upper surface of the container of battery cell 10, a gas exhaust portion 11 is attached. As the pressure in the container increases, gas exhaust portion 11 is ruptured to open so as to release gas inside the container to the outside of the container.

Casing 15 is disposed to cover a plurality of battery cells 10. Casing 15 serves to protect a plurality of battery cells 10 against impact. In casing 15, a plurality of battery cells 10 that are stacked together in the thickness direction are housed.

To the upper side of gas exhaust portions 11 attached to the containers of stacked battery cells 10, smoke exhaust path 13 is attached for receiving gas released from inside the containers when gas exhaust portions 11 are ruptured to open. As shown in FIGS. 1 and 2, smoke exhaust path 13 has a shape of a duct with a rectangular cross section. One end of smoke exhaust path 13 forms an outlet nozzle 14 protruding outward from casing 15.

To outlet nozzle 14 of smoke exhaust path 13, smoke exhaust duct 17 is fit to be connected. Smoke exhaust duct 17 includes a linear portion 17a located closer to outlet nozzle 14 and a curved portion 17b located further from outlet nozzle 14.

From outlet nozzle 14, linear portion 17a extends in the rightward direction of vehicle 40. From linear portion 17a, curved portion 17b is curved downward toward a hole 42 formed in a floor panel 41 of vehicle 40. The leading end of curved portion 17b is inserted in hole 42, and an exhaust port 18 of smoke exhaust duct 17 protrudes outward from vehicle 40.

Vehicle-mounted battery apparatus 100 includes a check valve 30 disposed in smoke exhaust duct 17 for blocking a gas flow from outside vehicle 40 toward battery pack 20. Check valve 30 disposed in linear portion 17a includes a valve seat 31 and a valve body 32.

Vehicle 40 supplies electric power from battery pack 20 to a driving motor. Vehicle 40 may be an electric vehicle, a hybrid vehicle, or the like.

Figure 3:
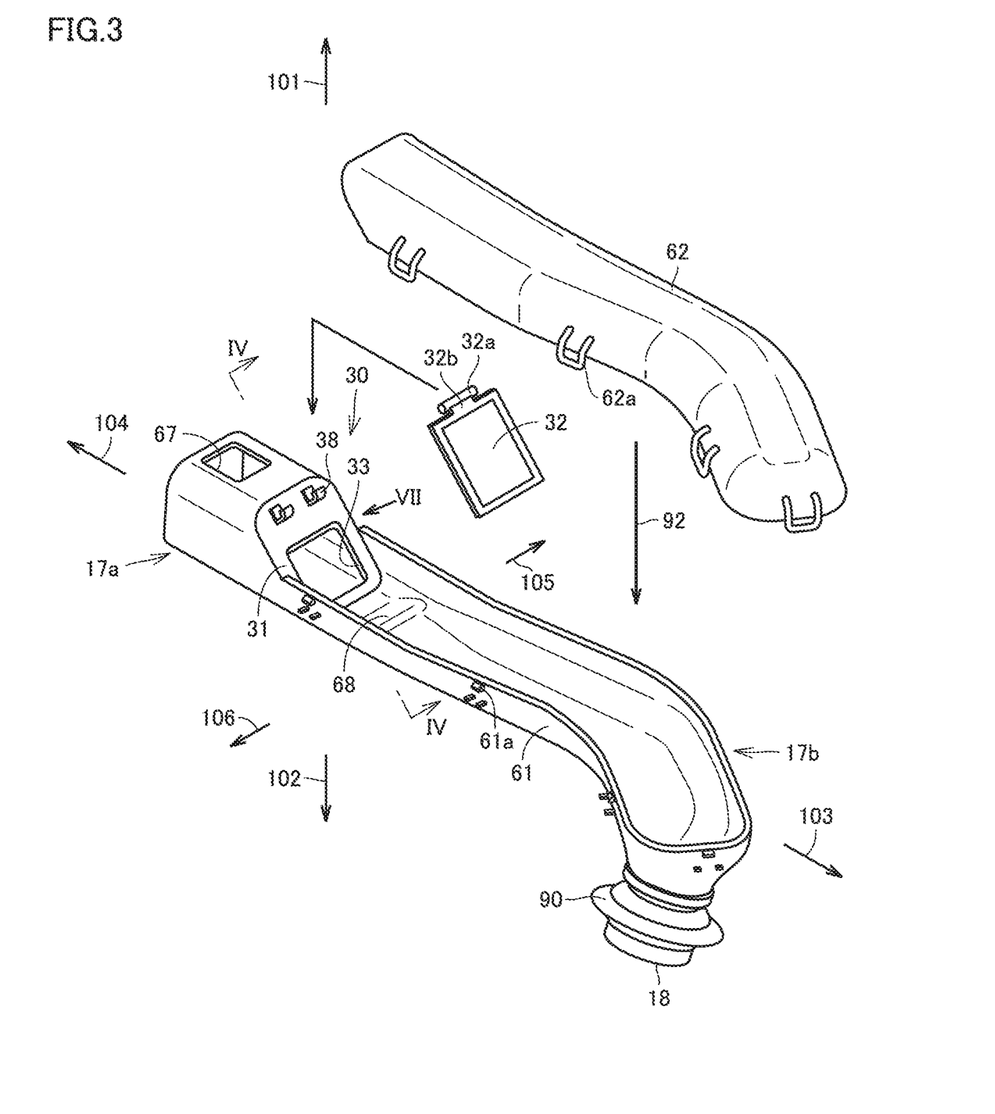
FIG. 3 is an exploded perspective view of a smoke exhaust duct of the vehicle-mounted battery apparatus according to the first embodiment.

FIG. 3 is an exploded perspective view of the smoke exhaust duct of the vehicle-mounted battery apparatus according to the first embodiment. As shown in FIG. 3, smoke exhaust duct 17 includes a main body 61 as a first member including linear portion 17a with a substantially rectangular cross section and curved portion 17b with a substantially circular cross section, and also includes an upper half 62 as a second member which is fit to main body 61. As shown in FIG. 3, linear portion 17a of main body 61 extending in the left-to-right direction of the vehicle is equipped with valve seat 31 inclined with respect to the horizontal direction. In a central portion of valve seat 31, a hole 33 is formed. Valve seat 31 is a flat plate in shape and inclined with respect to the horizontal direction so that the battery pack 20 side of valve seat 31 is higher than the exhaust port 18 side of valve seat 31.

Valve body 32 is a flat plate in shape to cover hole 33 of valve seat 31 and have a peripheral edge facing valve seat 31. Valve body 32 includes a pivot shaft 32a and a support 32b supporting pivot shaft 32a. Valve body 32 is made from a resin for example. Among resins, a high-rigidity and high-thermal-resistance resin such as polypropylene is preferable.

Valve seat 31 includes two bearings 38. Bearings 38 can pivotally support pivot shaft 32a. Bearings 38 are arranged on a portion located upward of hole 33. While bearings 38 in the present embodiment are each curved in L shape, one of bearings 38 may be a tubular shape.

A cut-out hole 67 is formed in linear portion 17a. Cut-out hole 67 is fit to outlet nozzle 14 of battery pack 20 to thereby fix smoke exhaust duct 17 to outlet nozzle 14.

Linear portion 17a includes a ridge 68 extending orthogonally to the direction in which linear portion 17a extends. Ridge 68 is formed by protrusion of the inner circumferential surface of linear portion 17a. The distance from battery pack 20 to ridge 68 is longer than the distance from battery pack 20 to hole 33. Ridge 68 is located between exhaust port 18 and hole 33. Ridge 68 is disposed in the vicinity of valve seat 31. Ridge 68 is disposed so that moisture entering from exhaust port 18 can be stopped at ridge 68 to thereby prevent water from entering hole 33.

Upper half 62 can be moved from the position shown in FIG. 3 in the direction indicated by arrow 92 so as to be fit to main body 61. Upper half 62 is fit to main body 61 to form smoke exhaust duct 17. An engagement portion 62a disposed on upper half 62 is engaged with a hook 61a disposed on main body 61.

A packing 90 is fit in the vicinity of exhaust port 18 of main body 61. Exhaust port 18 is inserted in hole 42 of vehicle 40. Packing 90 is interposed between floor panel 41 of vehicle 40 and exhaust port 18 to hermetically seal the portion near exhaust port 18.

Figure 4:
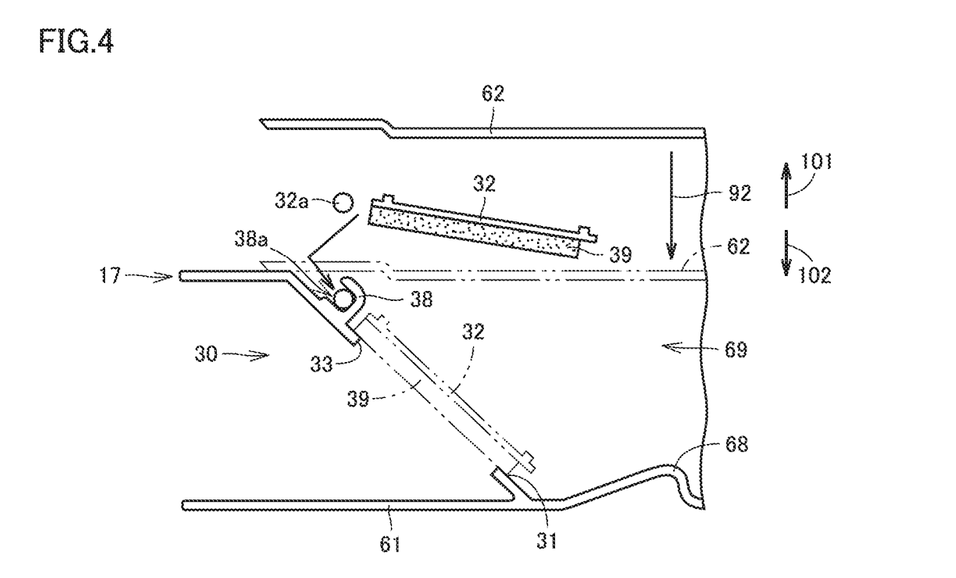
FIG. 4 is a cross-sectional view along line IV-IV in FIG. 3.

FIG. 4 is a cross-sectional view along line Iv-Iv in FIG. 3. Upper half 62 before being fit to main body 61 is indicated by solid lines. Upper half 62 is moved in the direction indicated by arrow 92 to be brought into contact with main body 61, so that a smoke exhaust space 69 can be formed.

An opening 38a of bearing 38 is opened to face upward. Pivot shaft 32a is inserted in opening 38a so that bearing 38 can support pivot shaft 32a. Upper half 62 is positioned above opening 38a to reduce opening 38a. In this way, pivot shaft 32a can be prevented from coming off from opening 38a. Pivot shaft 32a is a pivot center on which valve body 32 pivots. A shock absorbing member 39 is fixed to a lower side of valve body 32. Shock absorbing member 39 is formed of a porous material such as seal sponge. Shock absorbing member 39 may not necessarily be a porous material but may be any member capable of preventing sound which is generated upon contact with valve seat 31. Shock absorbing member 39 may be rubber, for example. In consideration of the fact that vehicle 40 is used for a long time, shock absorbing member 39 is preferably a material that does not deteriorate during the period for which vehicle 40 is used. Shock absorbing member 39 may be a nonwoven fabric such as felt. Further, shock absorbing member 39 may be a fibrous material. Shock absorbing member 39 may be EPDM (ethylene propylene diene monomer) rubber.

Ridge 68 is formed on the lower surface of main body 61. The height of ridge 68 is preferably higher than the lower end of hole 33. Thus, even when the water level in smoke exhaust space 69 increases, water can be prevented from entering hole 33.

In the present embodiment, shock absorbing member 39 is disposed on valve body 32. Alternatively, shock absorbing member 39 may be disposed on valve seat 31. Shock absorbing member 39 can be disposed on valve body 32 to reinforce valve body 32 by shock absorbing member 39. Shock absorbing member 39 can be disposed on valve seat 31 to avoid increase of the mass of valve body 32 so that valve body 32 can be opened quickly.

Figure 5:
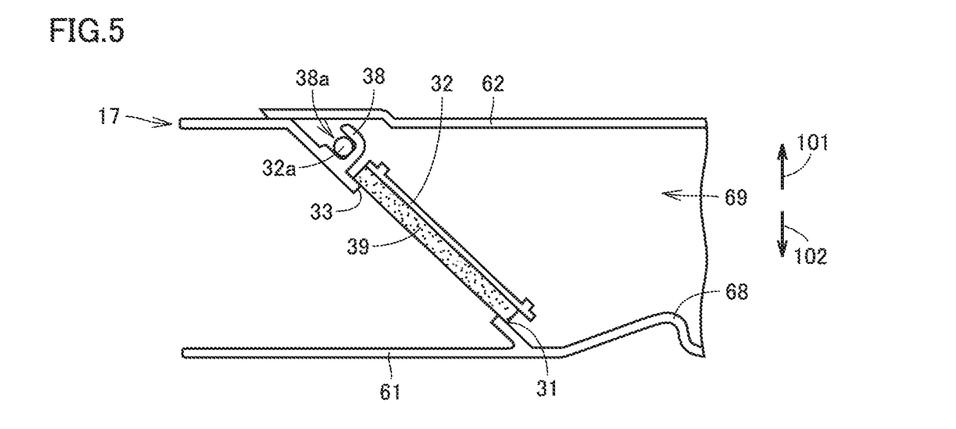
FIG. 5 is a cross-sectional view showing an assembled state of a smoke exhaust path shown in FIG. 4.

FIG. 5 is a cross-sectional view showing an assembled state of the smoke exhaust duct shown in FIG. 4. As shown in FIG. 5, in smoke exhaust duct 17 in the assembled state, valve seat 31 and valve body 32 are positioned to be inclined in smoke exhaust space 69 formed by main body 61 and upper half 62 of smoke exhaust duct 17. Valve body 32 is located lower than pivot shaft 32a. Valve body 32 and shock absorbing member 39 are prone to pivot downward on pivot shaft 32a. Valve body 32, however, cannot pivot further downward from the position shown in FIG. 5, due to contact between valve seat 31 and shock absorbing member 39. In contrast, for valve body 32 to pivot upward, no obstacle is present. Valve body 32 can therefore pivot upward from the position shown in FIG. 5.

Upper half 62 is located over opening 38a. The gap between upper half 62 and bearing 38 is smaller than the diameter of pivot shaft 32a. Pivot shaft 32a cannot therefore pass through the space between bearing 38 and upper half 62. Accordingly, pivot shaft 32a can be prevented from coming off from bearing 38.

Figure 6:
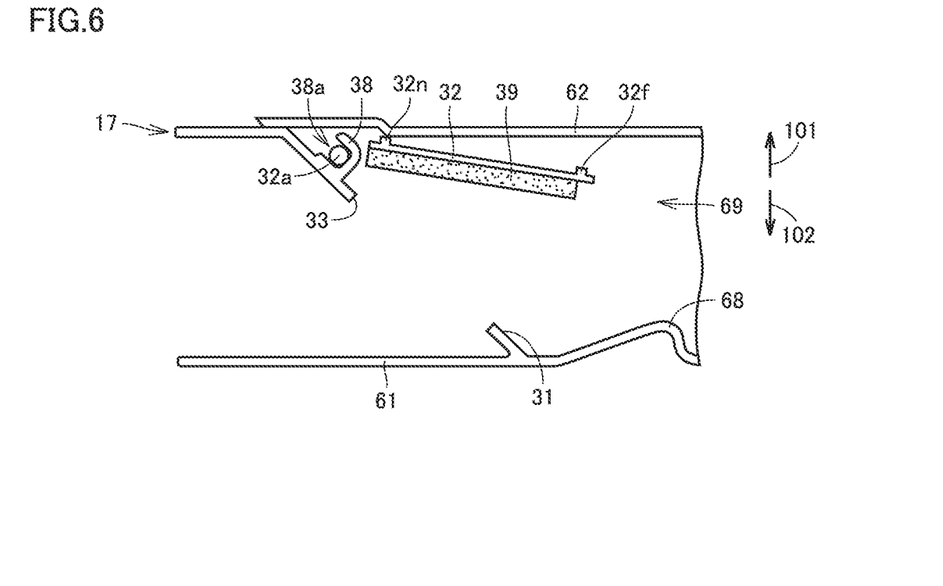
FIG. 6 is a cross-sectional view showing a state in which a valve body is opened in the smoke exhaust duct shown in FIG. 5.

FIG. 6 is a cross-sectional view showing a state in which the valve body is opened in the smoke exhaust duct shown in FIG. 5. Gas discharged from gas exhaust portion 11 shown in FIG. 1 is directed through smoke exhaust path 13 to smoke exhaust duct 17. In smoke exhaust space 69 of smoke exhaust duct 17, the gas flows from the inside toward the outside of the vehicle interior. Valve body 32 is pushed by this gas flow to be pivoted upward on pivot shaft 32a. Accordingly, hole 33 is opened. Valve body 32 is brought into contact with upper half 62. At this time, a rib 32n of the valve body located closer to pivot shaft 32a is brought into contact with upper half 62. Thus, the sound generated upon this contact can be reduced.

On the back side of valve body 32, rib 32n located closer to pivot shaft 32a and a rib 32f located further from pivot shaft 32a are disposed. The pivoting speed of ribs 32n and 32f is proportional to the distance from pivot shaft 32a. Therefore, the pivoting speed of rib 32n is smaller than the pivoting speed of rib 32f. The sound generated upon contact of rib 32n against upper half 62 is thus smaller than the sound generated upon contact of rib 32f against upper half 62. Accordingly, while rib 32n is brought into contact with upper half 62, rib 32f is not brought into contact with upper half 62, and the sound generated upon opening of valve body 32 can therefore be reduced.

Figure 7:
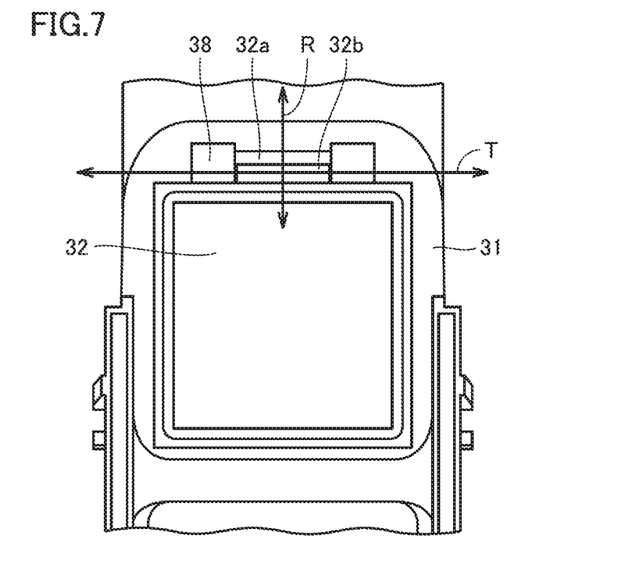
FIG. 7 is a plan view of the valve body as seen in the direction indicated by arrow VII in FIG. 3.

FIG. 7 is a plan view of the valve body as seen in the direction indicated by arrow VII in FIG. 3. Support 32b is attached to the topmost portion of valve body 32. Support 32b holds linear pivot shaft 32a. Valve body 32 is seated on valve seat 31 with shock absorbing member 39 interposed therebetween, and therefore, support 32b and pivot shaft 32a are prevented from moving in the radial direction indicated by arrow R and the thrust direction indicated by arrow T. Accordingly, generation of rattling sound due to vibration can be suppressed.

In vehicle-mounted battery apparatus 100 configured in the above-described manner, shock absorbing member 39 is disposed between valve body 32 and valve seat 31 for alleviating impact of valve body 32 against valve seat 31. It is therefore possible to alleviate impact between valve seat 31 and valve body 32. In this way, the volume of unusual noise (clattering sound) can be reduced.

Shock absorbing member 39 is fixed to valve body 32, and therefore, the stiffness of valve body 32 is increased. Accordingly, valve body 32 is less likely to be lifted up even when air flows into smoke exhaust duct 17, and generation of unusual noise can thus be suppressed.

Valve body 32 has a surface which faces valve seat 31, and shock absorbing member 39 is disposed on this surface. Therefore, when vehicle 40 vibrates, movement of valve body 32 can be restricted by the frictional force generated between shock absorbing member 39 and valve seat 31. Accordingly, generation of unusual noise due to movement of valve body 32 resultant from vibration of vehicle 40 can be suppressed.

Shock absorbing member 39 is a porous material, and therefore, foreign matters such as dust can be held in pores in the porous material. Accordingly, scattering of foreign matters can be suppressed.

Second Embodiment

Figure 8:
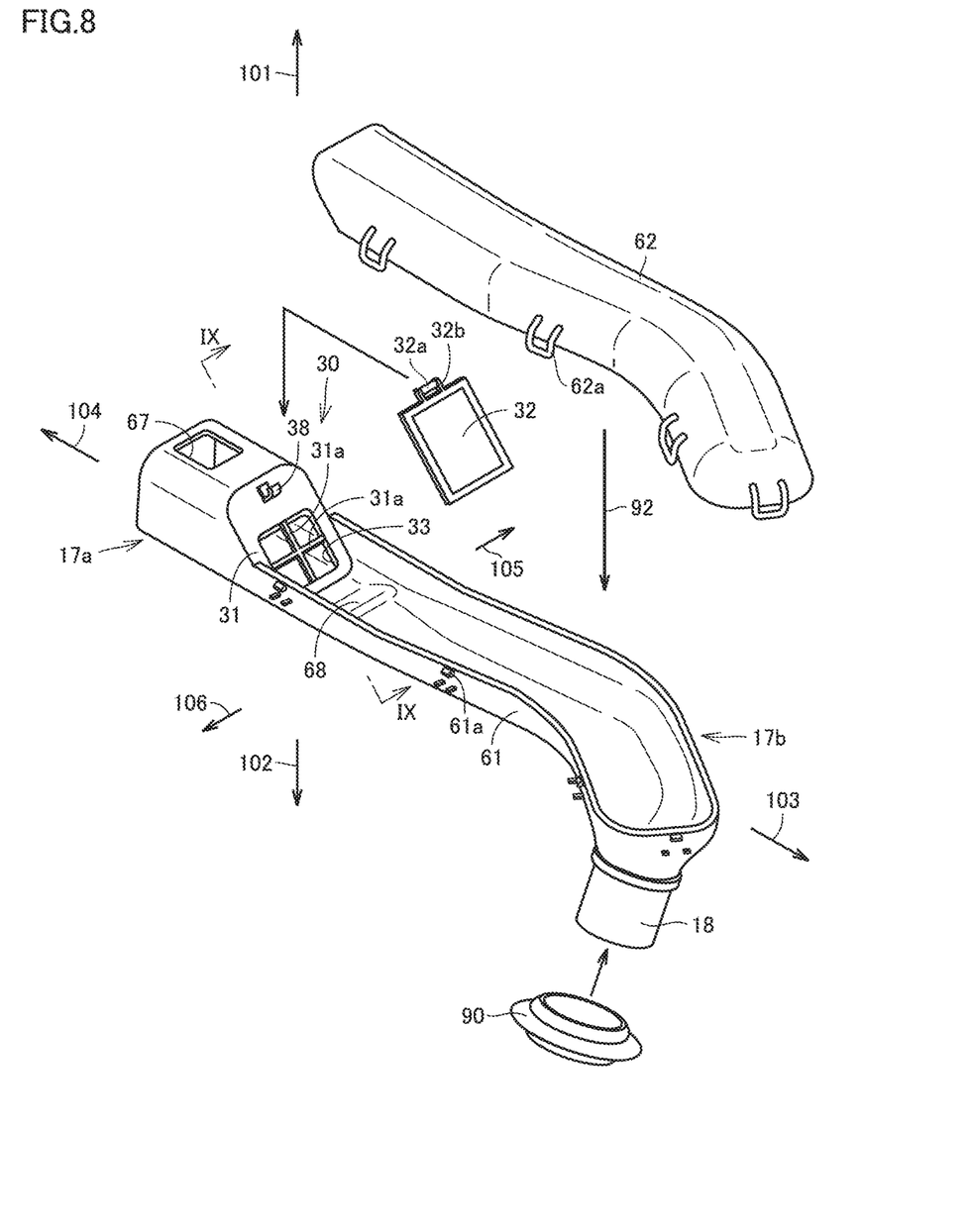
FIG. 8 is an exploded perspective view of a smoke exhaust duct of a vehicle-mounted battery apparatus according to a second embodiment.
Figure 9:
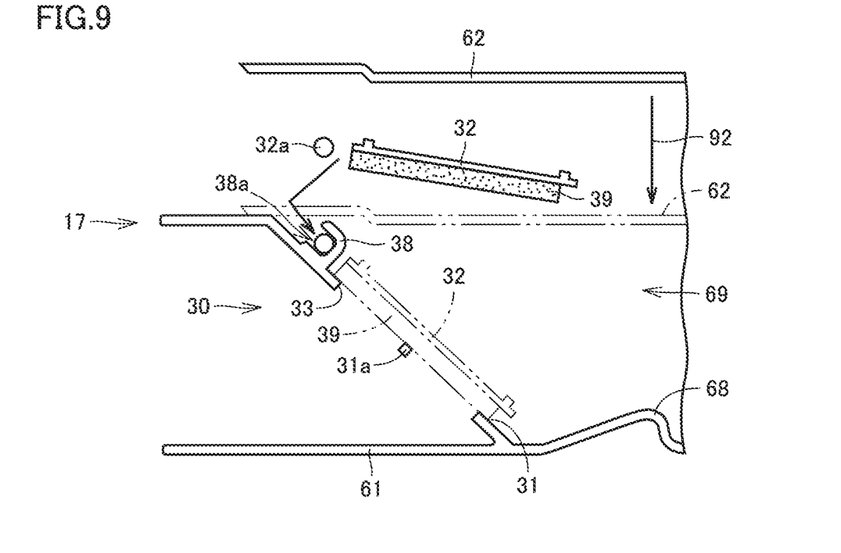
FIG. 9 is a cross-sectional view along line IX-IX in FIG. 8.

FIG. 8 is an exploded perspective view of a smoke exhaust duct of a vehicle-mounted battery apparatus according to a second embodiment. FIG. 9 is a cross-sectional view along line IX-IX in FIG. 8. As shown in FIGS. 8 and 9, in the smoke exhaust duct of the vehicle-mounted battery apparatus according to the second embodiment, ribs 31a are disposed in hole 33. In this example, ribs 31a in a cross shape are disposed in hole 33. Alternatively, ribs 31a in an X shape may be disposed in hole 33. In this example, two ribs 31a are shaped to intersect each other. Alternatively, multiple ribs 31a may be shaped not to intersect each other. Still alternatively, a single rib 31a may be disposed.

The second embodiment differs from the first embodiment in the structure of bearing(s) 38. According to the first embodiment, two bearings 38 spaced from each other by a predetermined distance support a single pivot shaft 32a. According to the second embodiment, a single bearing 38 supports a single pivot shaft 32a.

On respective opposite ends of pivot shaft 32a, supports 32b are disposed. Bearing 38 is inserted in the space surrounded by pivot shaft 32a, supports 32b on respective opposite ends of pivot shaft 32a, and valve body 32 to which supports 32b are connected.

Third Embodiment

Figure 10:
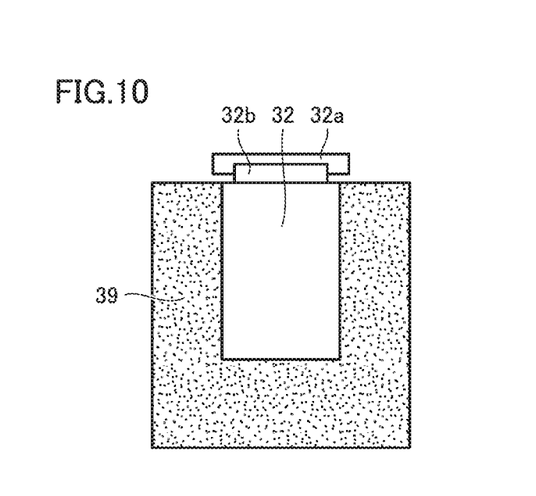
FIG. 10 is a plan view of a valve body for use in a vehicle-mounted battery apparatus according to a third embodiment.

FIG. 10 is a plan view of a valve body for use in a vehicle-mounted battery apparatus according to a third embodiment. FIG. 10 shows a surface of valve body 32 that is to face valve seat 31. As shown in FIG. 10, a shock absorbing member 39 is disposed on an outer peripheral portion of valve body 32 according to the third embodiment. Shock absorbing member 39 is disposed on only the outer peripheral portion, and therefore, the amount of shock absorbing member 39 used for the valve body can be reduced. Further, the total mass of shock absorbing member 39 and valve body 32 can be made smaller than those in the first and second embodiments.

Forth Embodiment

Figure 11:
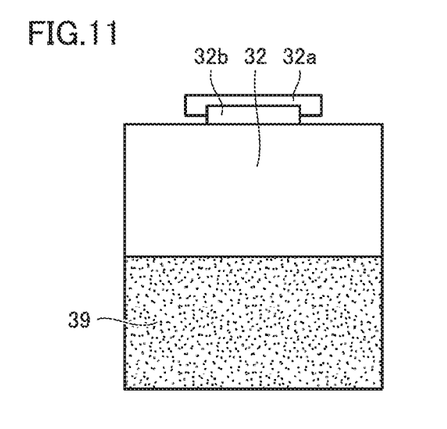
FIG. 11 is a plan view of a valve body for use in a vehicle-mounted battery apparatus according to a fourth embodiment.

FIG. 11 is a plan view of a valve body for use in a vehicle-mounted battery apparatus according to a fourth embodiment. FIG. 11 shows a surface of a valve body 32 that is to face a valve seat 31. As shown in FIG. 11, on valve body 32 in the fourth embodiment, a shock absorbing member 39 is disposed on only a portion of valve body 32 located further from pivot shaft 32a. About a half of the area of valve body 32 is covered with shock absorbing member 39.

Shock absorbing member 39 is disposed on only the lower half of valve body 32. The amount of shock absorbing member 39 used for the valve body can thus be reduced. Further, the total mass of shock absorbing member 39 and valve body 32 can be made smaller than those in the first and second embodiments.

Fifth Embodiment

Figure 12:
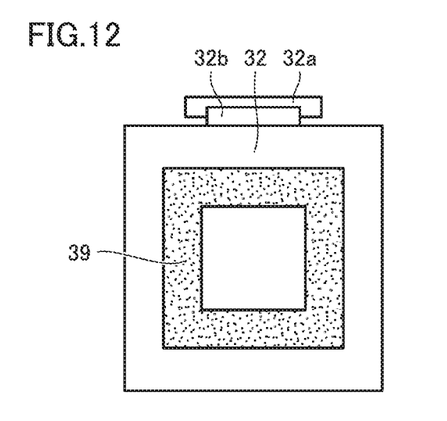
FIG. 12 is a plan view of a valve body for use in a vehicle-mounted battery apparatus according to a fifth embodiment.

FIG. 12 is a plan view of a valve body for use in a vehicle-mounted battery apparatus according to a fifth embodiment. FIG. 12 shows a surface of a valve body 32 that is to face a valve seat 31. As shown in FIG. 12, on valve body 32 in the fifth embodiment, a shock absorbing member 39 is disposed in a ring shape. The shock absorbing member is disposed in a rectangular shape.

Shock absorbing member 39 is disposed in a rectangular ring shape similar to the shape of valve body 32. The amount of shock absorbing member 39 used for the valve body can thus be reduced. Further, the total mass of shock absorbing member 39 and valve body 32 can be made smaller than those in the first and second embodiments.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle-mounted battery apparatus to be mounted in a vehicle, the vehicle-mounted battery apparatus comprising:
    a battery pack configured to be mounted in the vehicle and supply electric power to a driving motor of the vehicle, the battery pack comprising a battery cell, the battery cell comprising a gas exhaust portion configured to discharge internal gas;
    a smoke exhaust duct connected to the battery pack and configured to discharge gas to an outside of the vehicle; and
    a check valve disposed in the smoke exhaust duct and configured to block flow of gas from the outside of the vehicle toward the battery pack,
    the check valve comprising:
        a valve seat disposed in the smoke exhaust duct and having a hole;
        a valve body configured to be seated on the valve seat to cover the hole; and
        a shock absorbing member disposed between the valve body and the valve seat to alleviate impact of the valve body against the valve seat, wherein
    the smoke exhaust duct comprises:
        a first member having the hole; and
        a second member being in contact with the first member to form a smoke exhaust space in which gas flows,
    the first member comprises a bearing having an opening facing upward,
    the valve body comprises a pivot shaft,
    the pivot shaft is pivotally supported by the bearing,
    the second member is in contact with the first member to form the smoke exhaust space in which gas flows and cover the opening of the bearing so as to prevent the pivot shaft of the valve body from coming off from the bearing,
    the first member comprises an exhaust port through which gas discharged from the battery pack is released to the outside of the vehicle,
    the vehicle-mounted battery apparatus further comprises a ridge located between the exhaust port and the hole, and
    a height of the ridge is higher than a lower end of the hole.

2. The vehicle-mounted battery apparatus according to claim 1, wherein the shock absorbing member is fixed to the valve body.

3. The vehicle-mounted battery apparatus according to claim 1, wherein the shock absorbing member is disposed on a surface of the valve body, the surface facing the valve seat.

4. The vehicle-mounted battery apparatus according to claim 1, wherein the shock absorbing member is a porous material.

* * * * *